Patented Mar. 20, 1951

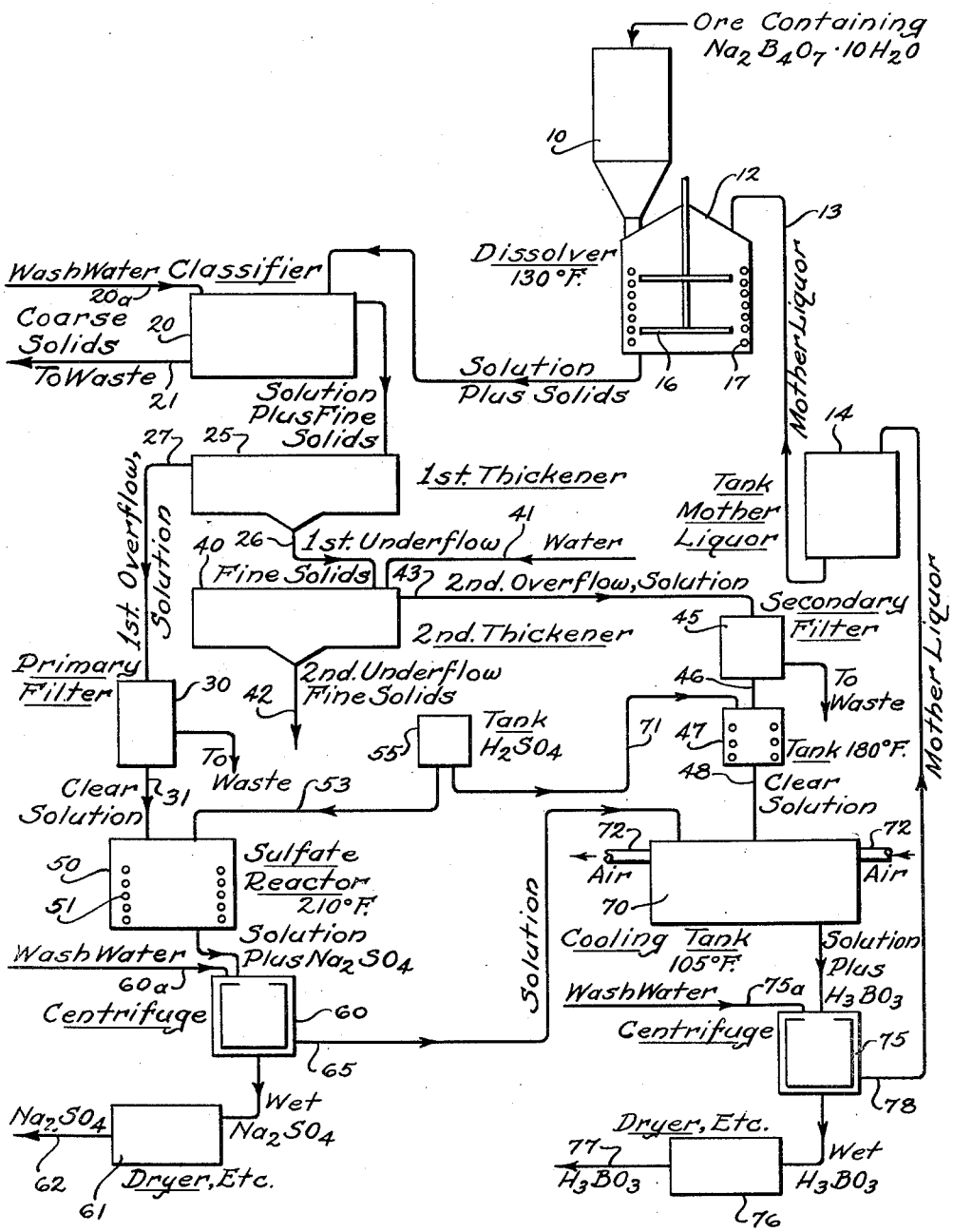

2,545,746

UNITED STATES PATENT OFFICE 2,545,746

PROCESS FOR THE MANUFACTURE OF BORIC ACID FROM SODIUM BORATE

Patrick Joseph O'Brien and Ronald Valda Chettle, Long Beach, Calif., assignors, by mesne assignments, to Borax Consolidated, Limited, London, England, a corporation of Great Britain and Northern Ireland Application October 29, 1946, Serial No. 706,336

1 Claim. (Cl. 23—149)

This invention relates to the production of boric acid and sodium sulfate from natural borate-containing ores and the like. We make use of the inverse temperature relations of the respective solubilities of boric acid and sodium sulfate in aqueous solution, by which sulfate can be precipitated out from a suitably acidulated mother liquor at a relatively elevated temperature, and boric acid can be crystallized out at a lower temperature, as described for example in United States Patent No. 1,950,106.

Briefly, this general process involves solution of the raw material, preferably a form of sodium tetraborate, in the circulated mother liquor, heating approximately to boiling point, addition of sufficient sulfuric acid to convert the added sodium to sulfate, removal of the precipitated sodium sulfate from the solution, cooling of the solution to a suitable temperature, such as 110° F., at which boric acid crystallizes out. After removal of the boric acid by centrifuging or the like, the mother liquor is recirculated and the cycle is repeated.

Such a process is relatively straightforward when artificial or already processed alkali borates are used as raw materials, but if sodium borate in the form of naturally occurring ores is to be used the process is complicated by the necessity of dissolving the salts from the ore in the mother liquor and then separating out and discarding the insoluble material. The coarser fraction of the insolubles can be removed without undue loss of the salt content of the solution by means of a conventional classifier; and nearly the whole of the remaining relatively fine insolubles can then be removed from the main bulk of the solution by means of a conventional thickener or settling tank. However, the underflow from this thickener must include enough of the solution to carry off the sludge, and this solution contains a significant fraction of the original salts. This might be returned to the system by filtering the underflow solution, but this would be relatively expensive both in equipment and in operating charges.

It is usual under such conditions to use two thickeners in series, the underflow from the first being introduced into the second of the series along with a quantity of additional solvent to act as a wash and dilute the solution. Part of the diluted solution in the second thickener is used to carry out the sludge, forming what we call the second underflow; and part forms the second overflow, which can be re-introduced into the system and its contained solutes thus saved. This procedure can be continued, adding successive thickening units to the series, until the underflow from the last unit is sufficiently dilute that the loss of solutes is not serious, or until the overflow from a further unit would be so dilute that it could not successfully be re-introduced into the system.

In the present instance, as will be shown in detail below, the overflow from the second thickener of such a series is already too dilute to be combined with the overflow from the first thickener and successfully treated in combination with it. This is because the combined solution after acidulation would contain so low a concentration of sodium sulfate that less than the required amount of this substance would precipitate out. Therefore, it would appear necessary that the entire salt content of the underflow from the first thickener be either wasted or recovered by relatively expensive means.

However, we have found that a second thickener can efficiently be introduced in series after the first, the overflow from the second thickener being separately treated in a secondary circuit and re-introduced into the main system at a later stage after the precipitation of sodium sulfate from the primary circuit has already been accomplished. When this is done according to our invention it is possible to recover substantially the whole of both the boric acid and the sodium sulfate contained in the secondary circuit, that is, in the second overflow, and to accomplish this with relatively little additional equipment or operating expense.

When the borate used as raw material for such a process is borax ($Na_2B_4O_7 \cdot 10H_2O$), containing ten mols of water per mol of sodium tetraborate, there is a net gain of five mols of water from the chemical reactions. Also, it is convenient, if not necessary, in all such processes to add water at various stages of the cycle, for example as a washing agent in the classifier and in the centrifuges; and in the particular process which we have developed water is also added to the second thickener. Some water is removed from the system with the wasted material, but in general, whether the process is intended to use straight borax or borax-containing ore as a raw material, the water content of the circulated liquor tends to increase. An important object of our invention is to eliminate sufficient water from the system to overcome and even to reverse this tendency, and to do this economically and without loss of salts. This is accomplished during the necessary cooling of the solution between precipitation of sodium sulfate and crystallization of boric acid. By making use of the evaporation of water from the solution to produce the required cooling, we are able to lower the temperature and the water content of the solution by a single operation.

It is particularly advantageous in carrying out the above described procedure that the solution in the secondary circuit to combined with that of the primary circuit before the latter is concentrated and cooled by evaporation to crystallize out boric acid from it. The primary solution by itself would contain a high enough concentration of sodium sulfate to cause some precipitation of sulfate even at the lowered temperature, contaminating the boric acid crystals. Addition of the relatively dilute secondary solution to the primary solution before (or during) cooling tends to counteract the loss of water by evaporation. This maintains the concentration of the solution at a sufficiently low level to hold the sulfate in solution, and yet allows boric acid to crystallize out to the required extent.

A clear understanding of our invention and of further objects and advantages thereof will be obtained from the following description of an illustrative preferred embodiment, which is not, however, intended to limit in any way the scope of the invention.

The attached drawing, Fig. 1, is a diagram illustrating schematically the main features of our process as applied in a particular instance, and is a part of this description.

Our process is a cyclic one, the mother liquor being used over again in the processing of successive batches of raw material. Although it is assumed for purposes of the present description that the process is carried through in batches of limited size rather than as a continuous flow process, it will be clear that a continuous flow may also be used in part or all of the system, appropriate modifications being made in the equipment.

In Fig. 1 we indicate at 10 a hopper from which ore is admitted as desired into the dissolving tank 12, mother liquor being admitted through the pipe 13 from a storage tank 14. Means for controlling the motion of materials are generally omitted throughout the diagram, as are various other features of the equipment which are well understood in the art. Stirring means within the dissolver 12, are indicated at 16 for hastening the solution of the soluble fraction of the ore, and steam coils 17 are preferably provided to raise the temperature to the neighborhood of 130° F. for the same purpose.

The mixture of the resulting solution and the insoluble fraction of the ore is passed through some suitable mechanism, indicated as classifier 20 to which wash water may be added at 20a and in which the larger solids, usually approximating half of the total solids, are removed at 21 together with a negligible part of the solution. The main bulk of the solution, carrying in suspension the remainder of the insoluble material, is carried on to the first thickener 25, which is typically a settling tank with conventional means for removing the sediment at 26. Enough solution, and preferably just enough, is taken off at 26 to fluidize and carry this sediment, the sediment and solution together comprising what we call the first underflow. The greater part of the solution in the first thickener leaves the tank at 27, constituting the first overflow, and carrying only a small amount of very fine solid material. The latter is removed in any suitable way, such as by the primary filter press indicated at 30. The solution leaving this filter press at 31 is suitable for the extraction of sodium sulfate and then boric acid in the usual way. The entire processing of this solution comprises what we call the primary circuit of the system.

The solution from the primary filter press is taken to the sulfate reactor 50 where it is heated by suitable means, such as the steam coils indicated at 51, to approximately 210° F. An appropriate quantity of sulfuric acid is added to the solution at 53 from the storage tank 55 to convert all $Na_2O$ in the solution to sodium sulfate. This raises the sulfate concentration above the solubility at this temperature and causes the precipitation of anhydrous sodium sulfate. The amount of sulfate precipitated can be calculated from known solubility data and can be controlled by suitable control of the sodium sulfate concentration of the original mother liquor and of other related factors. Since the process is to be cyclic, the quantity of sodium sulfate to be precipitated must correspond to the total quantity of sodium dissolved from the original ore, less that carried away at various stages of the process as waste. As will become clear later the sodium sulfate precipitated in reactor 50 does not necessarily correspond to the acid added at 53.

The precipitated sodium sulfate is removed from the solution in any suitable way, for example by centrifuging, as illustrated schematically at 60, a small amount of wash water being generally added to the centrifuge as at 60a. The precipitate is dried and otherwise processed as may be desired at 61 and emerges at 62 as a finished product. The remaining solution leaves centrifuge 60 at 65 and is carried to the cooling tank 70, where the temperature is reduced (see below) causing boric acid to crystallize out. The boric acid crystals are removed from the solution, as by centrifuge 75, the resulting solution being returned at 78 to tank 14 as mother liquor of the initial composition and suitable for repetition of the cycle.

We prefer for practical reasons to dissolve the ore initially at a temperature not much above 130° F. The combination of mother liquor and dissolved borates then preferably contains $B_2O_3$ and $Na_2O$ in a molar ratio of approximately 3.2 to 1.0, since this gives optimum solubility for the soluble ore fraction. It is then found in practice that even if the smallest practicable amount of mother liquor is used for each unit of ore, the concentration of $Na_2SO_4$ in the acidulated solution in sulfate reactor 50 is only slightly higher than is necessary in order to precipitate out the required amount of sodium sulfate. Therefore, any procedure which leads to appreciable further dilution of the solution at this stage would be impracticable.

Returning now to the first thickener underflow at 26, its fluid component contains dissolved salts in substantially the same concentration as those in the first overflow at 31. However, the solution in the underflow cannot be treated for precipitation recovery of the desired salts because of the presence of insoluble material. If this entire underflow is rejected the dissolved salts lost amount to an appreciable fraction of the total salts contained in the original ore. It is therefore desirable to process this first underflow in a second thickener, indicated at 40, additional wash water being added as indicated at 41 to dilute the solution. The amount of diluted solution which must be removed with the second underflow at 42 in order to carry off the sediment is approximately the same in volume as the undiluted solution in the first underflow. However, due to the dilution, a smaller quantity of salts is carried off in the second underflow, the remainder of the salts passing from the second thickener at 43 as a practically clear solution which we call the second overflow. This is preferably passed through a filter press as indicated at 45, yielding a clear solution at 46.

Although a large fraction of the salts in the first underflow have thus been saved by separation from the sediment, the second overflow is not suitable for treatment for recovery of these salts by the usual precipitation process (such as is carried on in reactor 50) since the salts to be removed are present in too low a concentration. Even at the highest practicable temperature and after conversion of all the sodium to sulfate by acidulation, sodium sulfate will not precipitate out. Moreover, even if the filtered second overflow were to be combined at this stage with the first overflow, and the combined solution were to be passed through reactor 50 with the filtered first overflow, the concentration of sodium sulfate in the acidulated combined solution would be insufficient to give the required amount of precipitation.

The answer which we have found for the above described problem is to treat the second overflow by a secondary circuit which by-passes the step of sulfate precipitation. From 46 the filtered solution is heated in tank 47 to approximately 180° F., and is then taken to the cooling tank 70 where it is combined with the solution coming from reactor 50 and centrifuge 60 in the primary circuit at a temperature somewhat below 210° F. Additional sulfuric acid is introduced into the secondary circuit at any convenient point, either directly into cooling tank 70, or preferably ahead of the cooling tank, for instance into tank 47 via the connection 71, in appropriate quantity to convert all of the sodium borate of the secondary circuit to sodium sulfate and boric acid. This sulfate remains in solution in the mother liquor through the remainder of the cycle. However, this does not cumulatively increase the sodium sulfate concentration of the mother liquor, since the amount of sulfate removed from the primary circuit on each cycle corresponds to the total sodium introduced into the solution from the ore (less waste, as already described). Expressed in other terms, the amount of sulfate removed from the primary circuit takes care of the sulfate formed in both circuits.

The combined solution in the cooling tank 70 may be considered to contain substantially only $H_3BO_3$ and $Na_2SO_4$, both these substances being in concentrations which are soluble at the initial temperature of about 180° F. As the temperature is reduced, the solution becomes supersaturated with respect to boric acid but not with respect to sodium sulfate, and crystals of substantially pure boric acid are formed. These are separated from the remaining solution in any suitable way, for example by means of a centrifuge as indicated at 75, wash water being ordinarily added as at 75a. The boric acid crystals are dried and otherwise processed at 76 as may be required, and emerge as a product of the system at 77. The remaining solution leaves the centrifuge 75 at 78 and is returned to storage tank 14 from which it can be drawn off and used as mother liquor to carry out another cycle.

The amount of boric acid thus thrown out of solution at 70 can be controlled by suitably controlling the concentration and temperature of the solution, provided, of course, that the sulfate concentration is maintained enough lower than its solubility to prevent appreciable precipitation and resulting contamination of the boric acid produced. To maintain the system in balanced operation, the amount of boron removed from the solution as boric acid at 70 should equal that added to the solution at 12 with the soluble ore fraction, less whatever is taken out of the system as waste.

The method which we preferably use for cooling the solution at 70 is the evaporation of a part of the water content of the solution. This can be accomplished by blowing a current of relatively dry air over the fluid surface in the tank, as indicated schematically at 72. Although a single cooling tank 70 is indicated in the figure, it will be understood that a battery of tanks can be used, or that any other means can be used by which the solution is cooled either wholly or partly by evaporating part of its water content.

An important advantage of this method of cooling the solution is that in addition to accomplishing the cooling function it reduces the water content of the solution. The exact amount of water which needs to be removed to bring the system into balance depends on many details of the process which will vary from one installation to another. When borax is used as the raw material, whether in the form of ore or otherwise, 10 mols of crystallization water are introduced into the solution with each mol of $Na_2B_4O_7$, and one additional mol of water is formed in the reaction with sulfuric acid. Six of these eleven mols of water are removed in the four mols of boric acid formed, and the remaining five must be removed from the solution in some other way. In addition to the net gain of water from the chemical reactions, the water balance is affected by other factors. These include the addition of water as such to the system, as wash water and the like, and the removal of water from the system in the solution which is rejected at various stages as waste.

In most systems these other factors are subject to adjustment within a limited range to give either a net gain of water or a small net loss. But a large, or even an appreciable, net loss of water due to these factors ordinarily results in impaired efficiency of the system, and cannot in practice be made to overcome the water increase from the chemical reactions. However, in our process the water removed by evaporative cooling is sufficient not only to balance the net increase of $H_2O$ from the chemical reactions but also to balance a considerable net increase due to the other factors mentioned. It is advantageous to have such a margin available, since the balance can then always be restored readily by adding water at some convenient point in the cycle.

When the sodium sulfate, the boric acid, and the water are separately balanced for the system as a whole, as described above, the remaining mother solution which is returned from centrifuge 75 to tank 14 has the same composition as the original mother liquor that was taken from tank 14 to dissolver 12 at the start of the operation. The process can therefore be repeated indefinitely, either continuously or as a batch process.

It may be pointed out that the secondary circuit need not rejoin the primary circuit at the air cooler, but can, at least in theory, rejoin it at any other point after sulfate reactor 50, and either before or after cooling tank 70. For example, the solution leaving secondary filter 45 at 46 can be taken directly to mother liquor storage tank 14, the sulfuric acid needed to convert the $Na_2O$ in the secondary circuit solution to $Na_2SO_4$ being added at any suitable point. The secondary circuit would then by-pass the step of boric acid crystallization as well as the step of sulfate precipitation. However, the total amount of boric acid crystallized out at 70 would remain unchanged, this quantity being determined, as described above, to preserve the over-all balance of the system with respect to boric acid.

In practice, we have found it advantageous to add the secondary solution to the primary solution before completion of the step of cooling and concentration by air evaporation. The primary solution leaving sulfate reactor 50 is approximately saturated with $Na_2SO_4$. As the solution is cooled by evaporation in cooling tank 70 the solubility of sulfate increases with decreasing temperature, but the concentration of the sulfate also increases, because of the removal of water from the solution. These two factors may nearly balance, so that if the primary solution is treated by itself in the cooling tank it remains virtually saturated with sulfate. Therefore some sulfate may be precipitated during the cooling operation, contaminating the boric acid crystals which are being formed at the same time. However, if the more dilute secondary solution is combined with the primary solution the latter is diluted, and this more dilute combined solution can then be cooled by evaporation and boric acid crystallized from it without precipitation of sulfate. By heating the secondary solution as indicated at 47, to approximately the temperature of the secondary solution before the two are combined, uneven precipitation is avoided.

We shall now give a rather detailed description of a typical manner in which our invention can be carried out in accordance with Fig. 1. The figures used in this description are the result of experience with a particular successful application of the invention, but are used here only by way of illustration and not as a limitation. For clarity of description certain small corrections, not essential to an understanding of our invention, are omitted in this description. Accordingly the figures given are necessarily somewhat approximate.

It is assumed that the ore to be treated contains 31.5% insoluble material, the remainder being borax ($Na_2B_4O_7 \cdot 10H_2O$), so that the $B_2O_3$ content is 25%. We use mother liquor with an initial composition of 8.1% $H_3BO_3$, 30.6% $Na_2SO_4$, and 61.3% $H_2O$. Under these conditions, in order to give a borate solution containing $B_2O_3$ and $Na_2O$ in the molar ratio of 3.2 to 1.0, it is necessary to use 330 lbs. of mother liquor per 100 lbs. of ore treated. The resulting solution then contains 10.0% $B_2O_3$, 2.8% $Na_2O$, 25.4% $Na_2SO_4$, and 61.8% $H_2O$, and carries with it about 8 lbs. of insoluble material per 100 lbs. of solution. Approximately half of the insolubles, comprising the coarser fraction, is removed in classifier 20, together with a negligible quantity of solution.

Further separation occurs in first thickener 25, approximately 16% of the solution being taken off in the underflow at 26 as a carrier for the remaining insolubles; and 84% of the solution comprising the first overflow, which is then filtered at 30, carried to sulfate reactor 50, and heated to 210° F. The composition of this solution is substantially that given above, and it therefore requires about 4.5 lbs. of 98% $H_2SO_4$ per 100 lbs. of solution to transform its contained sodium borate to sodium sulfate and boric acid. The acidulated solution has the composition 17.1% $H_3BO_3$, 30.4% $Na_2SO_4$, and 52.5% $H_2O$, or approximately 57.8 lbs. of $Na_2SO_4$ per 100 lbs. of $H_2O$.

According to solubility data, at a temperature of 210° F. and in the presence of 17% $H_3BO_3$, approximately 48.8 lbs. of $Na_2SO_4$ can be dissolved per 100 lbs. of $H_2O$. Therefore 9 lbs. of $Na_2SO_4$ will be precipitated per 100 lbs. of $H_2O$, or about 4.7 lbs. per 100 lbs. of solution. However, to maintain an overall balance with respect to $Na_2SO_4$, we preferably add about 0.65 lb. water per 100 lbs. of solution in sulfate reactor 50, thus reducing the amount of $Na_2SO_4$ precipitated from that given above to about 4.4 lbs. After centrifuging at 60, the remaining solution, with the composition 17.9% $H_3BO_3$, 27.0% $Na_2SO_4$, and 55.1% $H_2O$, goes to the cooling tank 70.

Returning now to the underflow from first thickener 25, comprising about 4 lbs. of insolubles and 16 lbs. of solution for each 100 lbs. of initial borate solution, this is taken to second thickener 40 and diluted by addition of 9.7 lbs. of water (calculated on the same basis). The resulting relatively dilute solution is divided into two approximately equal parts, one part carrying off the insolubles in the second underflow at 42, which is rejected, and the other, comprising the second overflow, forming the second circuit of the system. Acidulation of the second overflow requires about 2.7 lbs. of 98% $H_2SO_4$ per 100 lbs. of solution and results in a solution with the following composition: 10.7% $H_3BO_3$, 19.1% $Na_2SO_4$, and 70.1% $H_2O$. This is combined with the solution from the primary circuit, from which a definite amount of $Na_2SO_4$ has already been removed, and the combined solution is cooled in cooling tank 70.

It may be pointed out here that the acidulated secondary solution contains less than 28 lbs. $Na_2SO_4$ per 100 lbs. of water, compared with a solubility of over 45 lbs., so that no sulfate will precipitate out. Also, if this secondary solution were to be combined with the solution in the primary circuit before extraction of sulfate from the latter, the combined solution would contain only 52.7 lbs. $Na_2SO_4$ per 100 lbs. of water, and would precipitate out an insufficient quantity of sulfate (see above).

The combined solution actually produced in cooling tank 70 has an approximate composition of 16.9% $H_3BO_3$, 25.8% $Na_2SO_4$ and 57.3% $H_2O$, or 29.6 lbs. boric acid and 45.1 lbs. sulfate per 100 lbs. of water. Water is removed by evaporation during the process of cooling the solution to about 105° F., and boric acid is removed by crystallization at this lowered temperature. Since more water is evaporated than is necessary to balance the system with respect to water, some further water must be added to the system. This can be used to regulate the amount of boric acid crystallization, reducing the crystallization as necessary by diluting the solution in the cooling tank, and adding the remainder of the water to the solution after extraction of the boric acid crystals in centrifuge 76. By adjusting the added water in this way so that 17.7 lbs. of boric acid are crystallized out and a net loss of 9.6 lbs. of water is effected per 100 lbs. of solution originally entering the cooling tank, the resulting solution has the same composition given above for the original mother liquor. It can therefore be returned directly to storage tank 14, and used for another cycle of the system.

This detailed example is based upon the use of tincal ore, the soluble portion of which is largely borax. Other sodium borates than borax can also be treated by our process, and the principal modifications which are then necessary in the procedure are concerned with the water balance of the system. For example, if kernite is used as raw material, only four mols of water are introduced into the solution with each mol of sodium tetraborate. Therefore considerably more water can be added to the second thickener and the water removed by evaporation will still be sufficient to maintain the water balance. It may under certain circumstances be desirable to partially dehydrate either tincal ore or kernite before introducing it as raw material in the present process. For example the expense of shipping ore long distances can be reduced by eliminating a part of the water of crystallization; or an intermediate waste product from another process, such as middlings from the production of calcined kernite may be employed as raw material.

We claim:

In a cyclic process for producing boric acid from sodium borate containing ore, which process includes the steps of mixing the ore with an aqueous mother liquor to dissolve the borate, separating the resulting mixture of borate solution and insoluble material into a primary solution part which is relatively solid-free and a solid-containing part, acidulating the primary solution to form boric acid and sodium sulfate, precipitating sodium sulfate from the treated primary solution at a relatively elevated temperature, removing the precipitate, cooling the remaining solution and thus crystallizing boric acid from the remaining solution at a relatively lower temperature, removing the boric acid crystals and returning the remaining solution as mother liquor for repetition of the cycle; the improvement which comprises diluting the said solid-containing part, separating the diluted solid-containing part into a relatively dilute secondary solution which is relatively solid-free and a second solid-containing part, acidulating the sodium borate of the secondary solution to produce boric acid and sodium sulfate, combining the relatively dilute secondary solution, before removing any solutes therefrom, with the primary solution after the said step of removing precipitated sodium sulfate from the primary solution and before completion of the said step of crystallizing boric acid from the primary solution, and cooling the combined solutions for precipitation of boric acid by evaporation of water therefrom, precipitation of sodium sulfate during that evaporative cooling being prevented by sufficient dilution of the primary solution, that dilution of the primary solution being produced primarily by its combination with the relatively dilute secondary solution, and the overall balance of the system being maintained substantially constant with respect to water, sodium sulfate and boric acid.

PATRICK JOSEPH O'BRIEN.
RONALD VALDA CHETTLE.

REFERENCES CITED

The following references are of record in the file of this patent:

UNITED STATES PATENTS

| Number | Name | Date |
| --- | --- | --- |
| 1,216,187 | Trump | Feb. 13, 1917 |
| 1,424,447 | Burnham | Aug. 1, 1922 |
| 1,516,550 | Smith | Nov. 25, 1924 |
| 1,790,436 | Mumford | Jan. 27, 1931 |
| 1,944,548 | Ebner | Jan. 23, 1934 |
| 1,944,598 | Franke | Jan. 23, 1934 |
| 1,950,106 | Franke | Mar. 6, 1934 |
| 2,045,301 | Langer | June 23, 1936 |
| 2,104,009 | Burke | Jan. 4, 1938 |

FOREIGN PATENTS

| Number | Country | Date |
| --- | --- | --- |
| 192,032 | Great Britain | Nov. 26, 1923 |